July 22, 1930.  J. V. MARTIN  1,771,053
LOW RESISTANCE AEROPLANE
Original Filed May 3, 1919   4 Sheets-Sheet 1
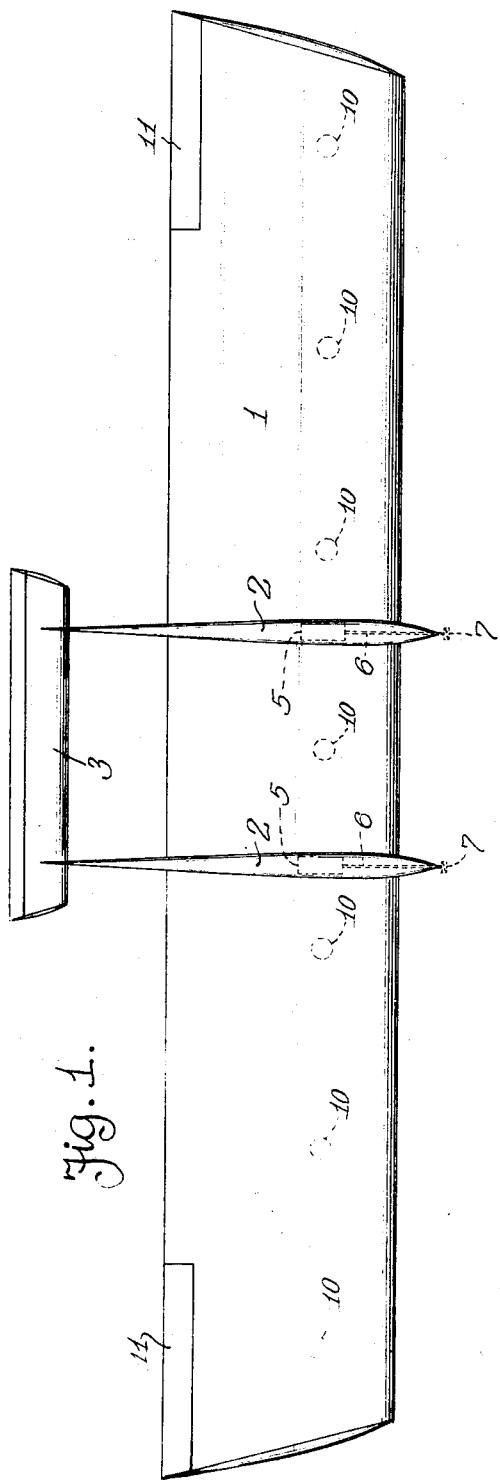
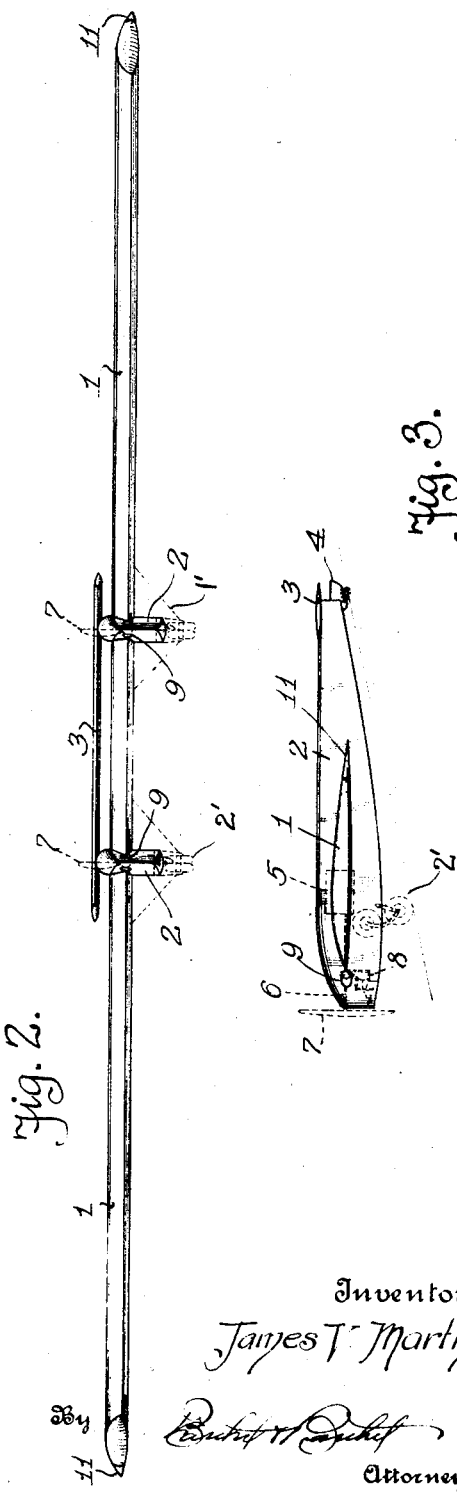
Inventor
James V. Martin,
By
Attorneys

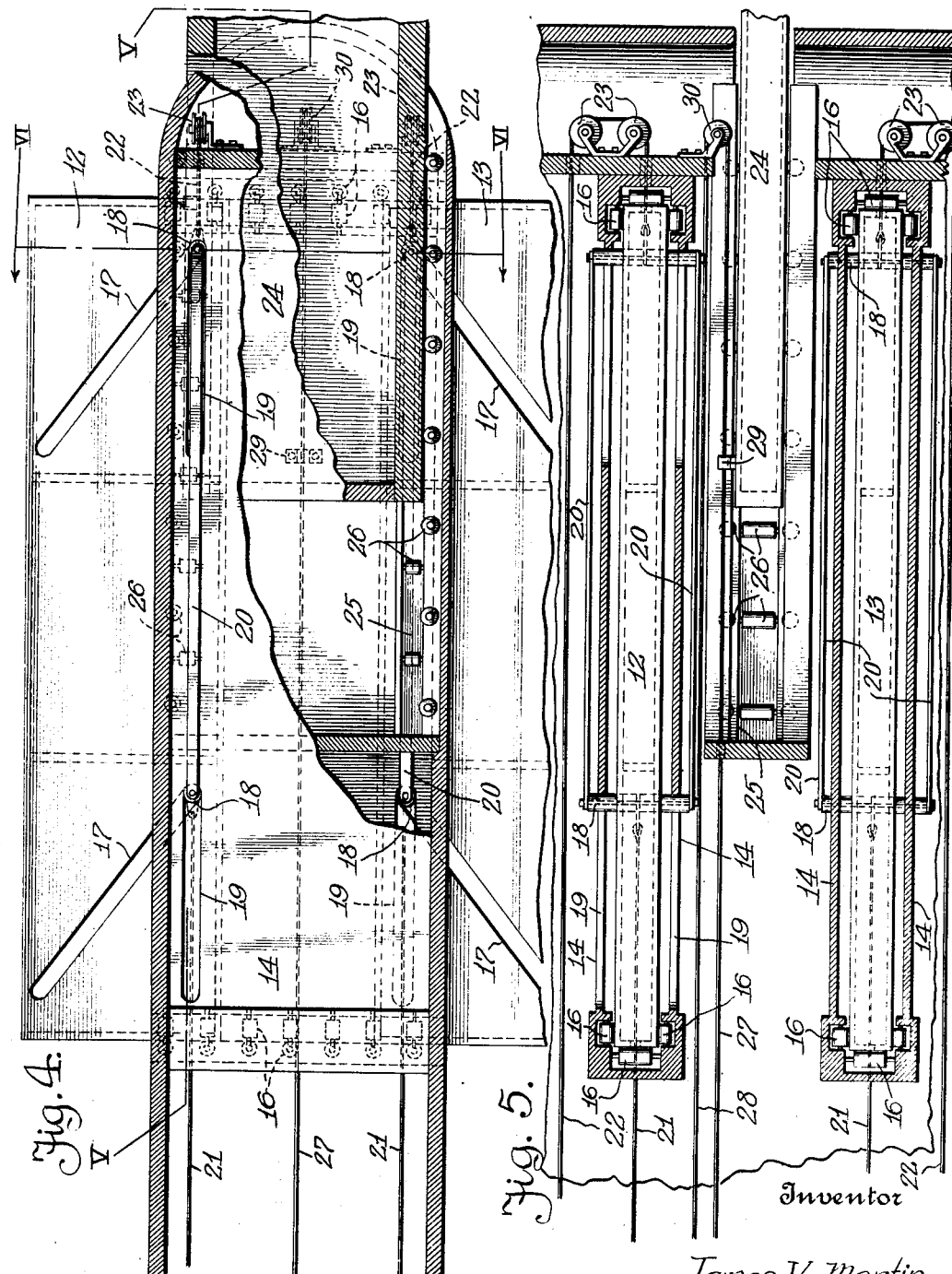

July 22, 1930.  J. V. MARTIN  1,771,053
LOW RESISTANCE AEROPLANE
Original Filed May 3, 1919  4 Sheets-Sheet 3

Inventor
James V. Martin,
By
Attorneys

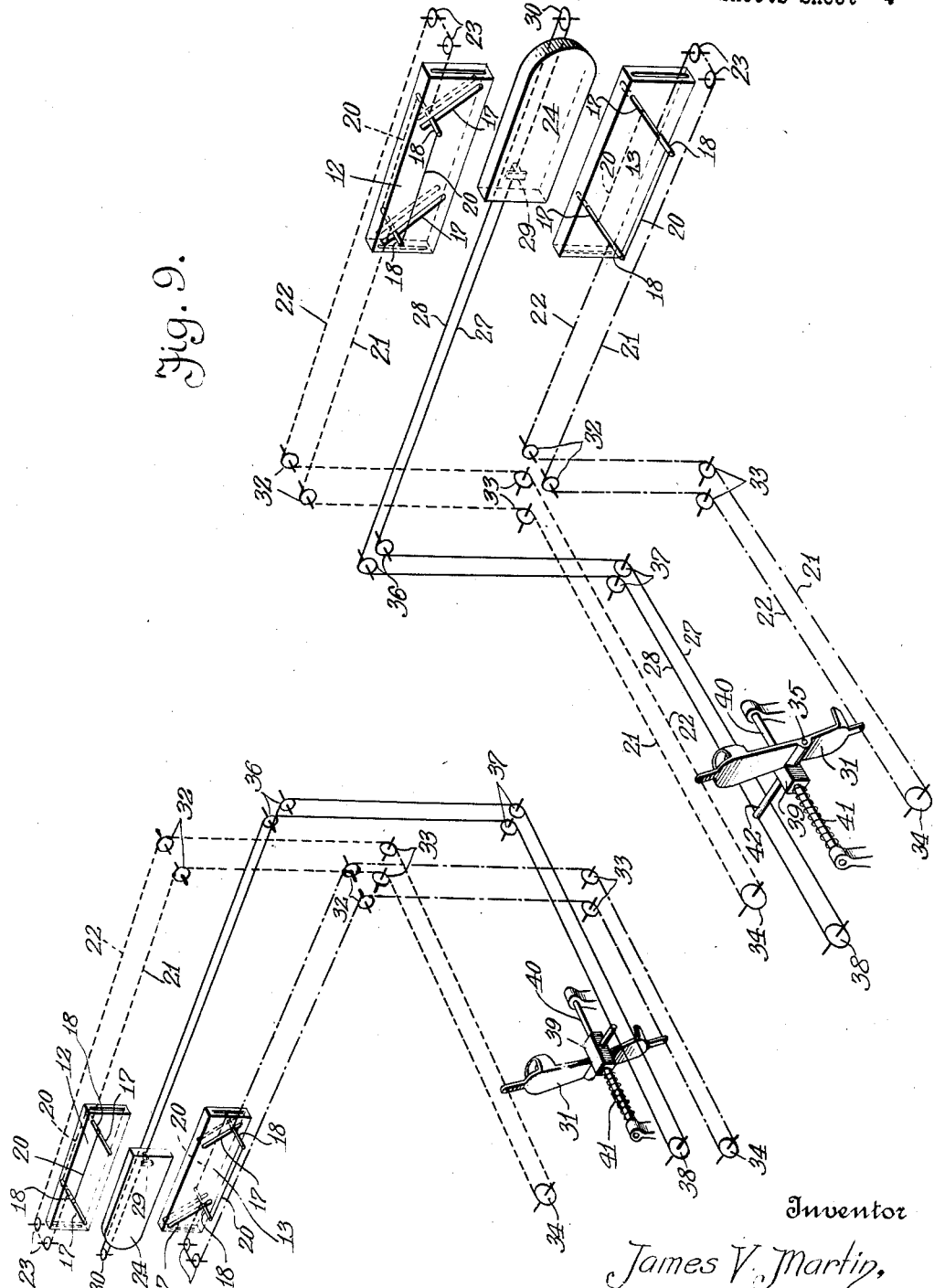

Patented July 22, 1930

1,771,053

UNITED STATES PATENT OFFICE

JAMES V. MARTIN, OF GARDEN CITY, NEW YORK

LOW-RESISTANCE AEROPLANE

Application filed May 3, 1919, Serial No. 294,466. Renewed August 31, 1928.

This invention relates to an improved form of aeroplane or seaplane wherein the useful or aerofoil resistance is so disposed as to secure the maximum advantage therefrom and useless or structural resistance is eliminated.

The primary object of the invention is to greatly improve the lift-drag ratio of aeroplanes by eliminating structural resistance and housing all control wires and at the same time preserve their aspect ratio and practical maneuvering features.

A further object is to provide novel and improved means for securing directional moment independently of rudders or the like commonly employed for the purpose, and, further, to provide a construction and arrangement which is such as to give the pilot an unobstructed view in all directions and wherein the controls are conveniently located within a protected pilot's cabin.

A further object is to provide a construction wherein the fuselage serves primarily as directional fin area and is so shaped as to lessen the drag, and wherein the weight of motors and other useful load is so distributed throughout the wing structure as to avoid extreme cantilever action.

It is also an object of the invention to provide a construction wherein chassis and all external bracing may be retracted and housed within an aerofoil fuselage, and wherein the fuselage and other aerofoil structures are water tight, thus providing buoyancy so that the aeroplane may alight upon or rise from the water.

A further object is to provide suitable means for retarding or checking forward motion in flight, to serve as an air brake in alighting and the like, and to so arrange such means as to be useful for directional or in cooperation with ailerons for lateral maneuvering purposes. Where the word surface is used in connection with the aeroplane wing, the meaning is confined to the upper or lower profile of the wing and does not refer to the wing end.

With the above and other ends in view the invention consists in the matters hereinafter set forth and more particularly pointed out in the appended claims, reference being had to the accompanying drawings in which Figure 1 is a plan view of a structure illustrative of the invention;

Fig. 2, a front elevation of the same;

Fig. 3, a side elevation;

Fig. 4, an enlarged sectional detail of a wing end showing movable drag members with portions broken away and in section to show the construction;

Fig. 5, a horizontal section substantially upon the line V—V of Fig. 4;

Fig. 6, a transverse section substantially upon the line VI—VI of Fig. 4;

Fig. 9 is a diagrammatic view of controls and illustrating the manner of operating the movable drag members.

Figure 7:
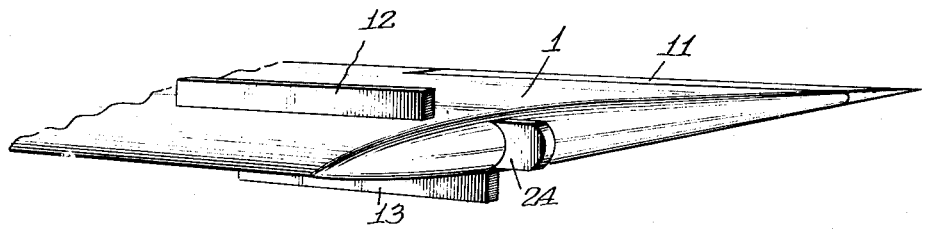
Fig. 7 is a perspective view of a wing end showing the drag members in projected position.

As shown in the drawing a single main sustaining aerofoil 1 is employed affording a wide expanse or spread of wing surface while its aspect ratio is maintained, and formed integral with this single aerofoil, are two directional fins 2 which are stream-lined to offer as little head resistance as possible and are constructed so as to serve the purpose of bodies or fuselages. These bodies are quite narrow as compared with their vertical depth, so that they will cooperate better as vertical fin area with any resistance or airflow altering devices on the wings, such as the drag or aileron devices; these bodies extend a distance below the lower side of the wing, they being built into and forming part of the wing, and the two bodies being spaced apart with the wing continuing across the space. As shown in Fig. 1, these bodies are quite short as compared with the length of the wing, and at their trailing ends, are connected by a movable stability aerofoil 3 which performs the usual function of lending longitudinal stability to the aeroplane. This aerofoil 3 being supported at widely separated points of its length upon the ends of the two bodies, it is unnecessary to provide framing or bracing outside the bodies to securely hold it in place, and it as well as the bodies being stream-lined, structural resistance is eliminated. Ground rudders 4 which also have a very small area as compared with the wing area, are attached to the trailing ends of the bodies in the usual manner to enable the aeroplane to maneuver by taxying on the ground.

Figures 6, 8:
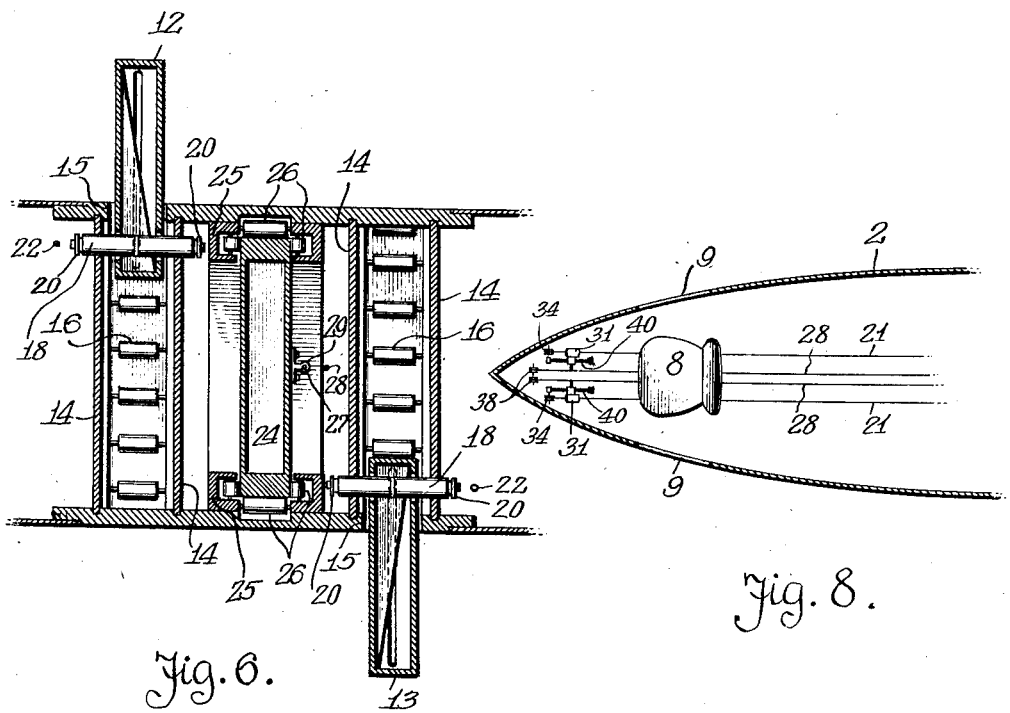
Fig. 8 is a sectional detail of the forward end of an aerofoil fuselage or pilot's cabin showing the position of controls relative to pilot's seat.

The fin bodies 2 provide a housing for the power plants or engines as indicated in dotted lines at 5 in Figs. 1 and 3 and the crank shafts 6 of these engines are extended forwardly through the nose of each fin and each provided with a propeller 7 on its outer end, also as indicated in dotted lines. In the extreme forward end of one or both of the fins, a seat 8, as shown in Fig. 8, is provided for the pilot and in each side wall opposite this seat is an opening 9, and these openings are so located as to give the pilot unobstructed vision in every direction, these openings being just forwardly of and in line with the leading edge of the wings, permitting the pilot to look rearwardly above or below the wing, and giving an unobstructed view forwardly and upwardly or downwardly. The controls hereinafter described are located adjacent this seat in a convenient position for operation, and if found desirable, duplicate seats and sets of controls may be provided, one in the forward end of each fin body, so that the weight of pilots, power plants, etc., will be evenly distributed.

The useful load is preferably distributed throughout the span of the wing or wings as indicated by the dotted circles 10 in Fig. 1, said main aerofoil or wing structure 1, thus performing the functions of a load carrying body, and the main function of the fuselages 2 becoming that of directional fins. The wing structure is so constructed and of such dimensions as to provide ample load carrying space, and this load space is located substantially one third of the chord length from the leading edge of the aerofoil. Cantilever action is thus minimized by the distribution of weight of motors and useful load throughout the length of main aerofoil, and thus the structure is less stressed under load when in flight, than when light. In other words, the usual weight distribution order is reversed, the load being carried by the main aerofoil throughout its length instead of being concentrated within a body or fuselage midway of the wing expanse as in the usual construction, this distribution being aided by providing two bodies spaced apart which are of just sufficient size to house engines and pilots, and to give directional fin areas sufficient to hold the aeroplane to its course and provide a turning center or fulcrum for directional moment.

The landing chassis 2' and the wing brace 1' therefor indicated in dotted lines in Figs. 2 and 3 are so constructed that they may be retracted within the fuselages and wing in any convenient manner and the chassis or body then closed water tight in a manner similar to that disclosed in my applications, aircraft running and alighting device, Serial No. 194,595, and aircraft structure, Serial No. 262,477, so that the structure will have buoyancy sufficient to permit landing upon or rising from the water, the wing structure being also made water tight as hereinafter described so that it will be sufficiently buoyant to carry its load when brought to rest upon a body of water. The construction also eliminates structural resistance as no external bracing, wires or struts are necessary in flight.

This monoplane adaptation may be regarded as an improvement upon my biplane adaptation of my double convex type of wing as shown in my copending Serial No. 204,602 and to my internally trussed aerofoil of the double convex type shown in my copending Serial No. 254,233, Figs. 6 to 12 inclusive.

Lateral stability is secured in the usual manner through the operations of ailerons 11 which are pivotally attached to and form a part of the trailing edge of the main aerofoil at the ends thereof. These ailerons are operated by the pilot or automatically, in any suitable manner, not shown.

Directional moment is assured through the operation of drag members located at the wing ends and so arranged for operation that they may also be employed as an air brake to resist forward movement of the aeroplane in flight. These drag devices comprise two rectangular members 12 and 13 adapted to be housed within the wing structure adjacent each wing end, and to slide vertically within guide casings 14 provided therefor between the upper and lower skin of the main aerofoil or wing, a slot 15 being provided in the upper skin opposite the guide casing through which the drag member 12 may be projected vertically. A like slot 15 is provided in the lower skin of the aerofoil through which the drag member 13 is adapted to be projected. These drag members 12 and 13 are box-like structures which, when projected, present a flat plane surface in the direction of flight and sharp rear angles, thus creating maximum head resistance and each is so mounted in its guide casing 14 as to move freely in and out through the slots 15 with a minimum of frictional resistance. To so mount these drag surfaces, rollers 16 are journaled in the ends and sides of the casings 14 in contact with the ends and sides of the members and to effect the projection and retraction of each member, two diagonal or longitudinally inclined slots 17 are provided in the side walls of said members, one slot adjacent each end thereof, and engaging said slots are rollers 18 which also project through horizontally disposed guide slots 19 in the walls of the guide casing 14. The rollers 18 of each pair for each drag member, are connected by straps 20 so that they will move together and cables 21 and 22 are connected to the inner and outer rollers respectively to move the pair simultaneously in the desired direction along their guide slots 19 and cause the projection or retraction of the drag members by their engagement with the inclined slots 17 in said members. The cable 22 is led over pulleys 23 at the outer end of said members within the wing structure and both cables for each drag member are led inwardly through the wing to the controls within the pilot's cabin. Each drag member is thus positively operated in both directions of its movement and all controls and mechanisms are concealed within the wing structure.

A third or end drag member 24 for each wing end is movable longitudinally in suitable guides 25 extending inwardly from a slot in the end surface of the wing and these guides are provided with suitable anti-friction rollers 26 to engage the sides and top and bottom edges of each member so that the same will move freely in its guides. Cables 27 and 28, or the runs of a continuous cable, are attached to the end drag member at 29, the cable passing over a pulley 30 at the wing end, so that said member may be moved endwise to project it through the slot in the end of the wing, or retracted. The end edge of each member 24 is preferably shaped to conform to the transverse curvature of the wing end through which it is projected so that when retracted, said member will close the slot flush with the wing surface, and in a like manner, the outer edges of the members 12 and 13 close the slots 15 flush with the upper and lower surfaces of the wing, when in retracted position. When in fully retracted position, all of the drag members will preferably form water tight joints with the edges of the slots through which they are projected so that in alighting upon water, the wing structure will be buoyant and support its load. One of the expedients for this purpose would be the use of suitable packing on the edges of the movable drag members.

The drag members are operated by means of foot pedals 31 (Figs. 8 and 9) located in the forward end of the fuselage 2 or pilot's cabin, the cables for operating the drag members at one wing end being connected to one pedal, and those for the drag members at the other wing end being connected to the other pedal so that the members at one wing end may be operated simultaneously with or independently of those at the other wing end. The cables 21 and 22 for operating the drag members 12 and 13 are led longitudinally through the wing structures and passed over pulleys 32, thence downwardly to the bottom of the fuselage, over pulleys 33, and forwardly in the fuselage to the forward end thereof where they unite forming a single cable passing around a pulley 34, said cables or runs thus together forming a single cable with its ends attached to opposite ends of the movable roller frame comprising the rolls 18 which are connected by the straps 20. One run 22 of these operating cables is attached to the pedal, said run of the cable for operating the drag member 12 being attached to the toe portion of the pedal, and the like run of the cable for operating the drag 13 being attached to the heel portion of the pedal. The drag members 12 and 13 may therefore be simultaneously projected or retracted by turning the pedal upon its pivotal support 35 (see Fig. 9).

The runs 27 and 28 also form a single cable for operating the drag member 24, said cable extending longitudinally through the wing structure, over pulleys 36, downwardly into the fuselage, thence over pulleys 37 and forwardly to the forward end of the fuselage where the cable passes around a pulley 38. The pivot 35 of the pedal 31 is mounted upon a block 39 which is slidable upon a rod 40 extending longitudinally of the fuselage, against the action of a coiled spring 41 sleeved upon the rod between the forward end of the block and the forward support of the rod, and an arm 42 on the block is provided for the attachment thereto of the run 28 of the cable. The drag member 24 may thus be projected by sliding the pedal forwardly on the rod against the action of the coiled spring and will be retracted by the action of said spring when the pressure of the pedal is removed. A bodily forward movement of the pedal without tilting movement, will by reason of the connection of the cables therewith for operating the drags 12 and 13, project the drag members simultaneously with the projection of the end drag member 24, but the upper and lower drag members may be operated independently of each other by so operating the pedal that either the toe or heel thereof according to which member it is desired shall remain stationary, be held against movement and the opposite end be moved to cause a movement of the member which it is desired to operate, the supporting block of the pedal sliding upon its rod to permit one end of the pedal to remain stationary while the opposite end is moved. With this arrangement all three of the drag members at one wing end may be projected or retracted simultaneously and either the upper or lower drag operated independently of the other. The drag members at one wing end are also operable by one pedal independently of those at the other wing end, or all may be operated simultaneously through the manipulation of both pedals.

As previously stated, the rudders 4 are of small area as compared to that of the wings and the bodies upon the trailing ends of which the rudders are mounted are also short as compared to wing expanse, so that their directional effect upon the main aerofoil or wings is greatly reduced, but head resistance is reduced by thus reducing the size and length of rudders and fuselages as compared to wing area, the fuselages serving mainly as directional fins. It is therefore necessary to provide other means for giving directional moment, and this is the main function of the drag members.

When the drag members at one wind end only are projected, they create head resistance at that wing end which will turn the areoplane in this direction without tending to tlit or change the altitude of the areoplane, the fin bodies 2 being of sufficient area to resist side slippage. By projecting the drag members 12 simultaneouly, without projection of the members 13, head resistance is created at the upper side of the wing only, and in a like manner resistance may be created under the wing by simultaneously projecting the members 13. When all of the drag members at the ends of the wing are projected simultaneously, a head resistance is created equally upon the wings which does not tend to change its lateral or longitudinal balance, but simply serves as an air brake to retard forward progress, which is very essential in alighting and under certain conditions, in maneuvering. By the arrangement of controls for the drag members, the operation of these members is at all times under the control of the pilot who may operate them differently or simultaneously to secure the desired directional and manuevering results including either lift or depression of the wing extremity through manipulation of the drag members alone or in conjunction with a movement of the aileron. Further, by constructing the bodies or fuselages of small capacity, weight, and area as compared with the main aerofoil, spacing them apart and distributing the useful load throughout the length of the main aerofoil, the cantilever action to support the fuselages is minimized, and the areoplane is less stressed under load and in flight than when light. To secure inherent stability and improve the lift-drift ratio of the aeroplane, the useful load is located in the areofoil at the proper proportional distance of its chord from the leading edge, the ordinates of the under surface of the areofoil are each one-third the corresponding upper ordinates, and all structural resistance is eliminated. The arrangement of a fuselage which is narrow as compared with its vertical height, and which extends above and below the main single areofoil and provides a pilot's cabin forwardly of the entering edge of the main areofoil, gives the pilot an unobstructed view which is of great advantage in maneuvering.

What I claim is:—

1. A monoplane including a wing of the internally trussed variety, multiple tractor screws, multiple fin shaped fuselages extending from a point well forward of the said wing to rearward thereof, directional and longitudinal controls attached to the rear of said fuselages and means fitted to the wing extremities to alter the air flow about the said fuselages and control leads from the pilot's position through the interior of the said wing to operate the said means.

2. An air flow control member, located forward of an areoplane wing tip fore and aft center and extending along the upper wing surface transversely to the line of flight, a trailing edge aileron and controls leading from the pilot's position to operate the said member either independently or in conjunction with movement of the said aileron.

3. In combination with the upper surface of an aeroplane wing having a continuously convex upper and lower surface from leading to trailing edge and a trailing edge aileron, a device adapted to be retracted and projected into and out of the airflow forward of the said aileron, means connecting the said device with the pilot's position.

4. In an aeroplane the combination of a supporting aerofoil of biconvex upper and lower surface having a flexible trailing edge, an air resistance device forward of the said trailing edge and presenting a flat rear side transversely of the air flow and adapted in flight to lie within the said airflow of the said aerofoil, and means for projecting said device from its neutral position on the said aerofoil at the will of the pilot.

5. In an aeroplane, the combination of a wing having slots in the upper and lower surfaces thereof, drag members normally housed within the wing, and adapted to be projected through said slots at substantially right angles to the chord of the wing, and means for operating said members.

6. In an aeroplane, the combination of a wing having slots in the upper and lower surfaces thereof, drag members normally housed within the wing and extending longitudinally of the wing, and means for projecting said members through said slots, said members having substantially flat rear sides extending transversely of the air flow.

7. In an aeroplane, the combination of a main sustaining aerofoil, ailerons at the extremities of the said aerofoil, drag members adjacent said extremities and normally housed therein, said drag members being arranged to be projected from the upper or lower sides of said aerofoil to supplement the action of said ailerons, and means for independently operating said drag members.

8. In an aeroplane, the combination of a single main sustaining aerofoil having convex surfaces and openings therein, a streamlined body extending fore and aft of said aerofoil and integral therewith, said body being water tight to provide buoyancy, and drag members normally housed in said aerofoil and adapted to be projected through said openings and to close said openings.

9. In an aeroplane, the combination of a single main sustaining aerofoil having convex surfaces and openings therein, a streamlined body extending fore and aft of said aerofoil and integral therewith, guides in the aerofoil opposite said openings, drag members guided in said guides, and means for moving said drag members in said guides to project the same through said openings.

10. In an aeroplane, the combination of a main sustaining aerofoil having spaced upper and lower sides and ends provided with openings, drag members normally housed in said aerofoil and projectable through said openings, and means for operating said drag members adapted to be operated to project any one or all of said members.

11. In combination with an aircraft wing extremity, an aileron to raise and lower said wing extremity, a member independent of said aileron and projectable from said wing forward of the said aileron to alter the airflow over the top surface of the said wing and aileron and means for operating said member.

12. In combination with an aircraft wing extremity, an aileron to raise and lower the said wing extremity, a member independent of said aileron and located on the wing forward of the said aileron for altering the air flow over the top surface of the said wing extremity, the said member extending along the wing transversely to the line of flight and in one of its adjustable positions not materially affecting the said airflow, and means for operating said member independently of the operation of said aileron.

13. In combination with an aeroplane wing extremity, an aileron to raise and lower the said wing extremity, a slot running transversely of the wing's flight path and adjacent the wing surface at a position forward of the said aileron and means projectable from said slot to alter the airflow over the said aileron and adjacent wing surface.

14. In combination with the upper surface of an aeroplane wing, a device extending along the wing transversely to the direction of flight and adapted to be moved into and out of a position approximately at right angles to the airflow above the said wing, an aileron to rearward of the location of the said device and means connecting the said device with the pilot's position for the operation thereof.

15. The combination with an aeroplane wing having a trailing edge aileron, of a member extending transversely along the upper surface and positioned at substantially right angles to the line of flight forward of said aileron, for increasing the drag of the upper side of the wing, said wing forming a streamline housing for said member and means for projecting said member from its housing within the said streamline.

In testimony whereof I affix my signature.

JAMES V. MARTIN.